US010352391B2

(12) United States Patent
Adick et al.

(10) Patent No.: US 10,352,391 B2
(45) Date of Patent: Jul. 16, 2019

(54) VIBRATION DAMPER WITH A TRACTION STOP

(71) Applicants: THYSSENKRUPP BILSTEIN GMBH, Ennepetal (DE); thyssenkrupp AG, Essen (DE)

(72) Inventors: Hendrik Adick, Glandorf (DE); Alexander Ehinger, Ditzingen (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/551,105

(22) PCT Filed: Feb. 12, 2016

(86) PCT No.: PCT/EP2016/053043
§ 371 (c)(1),
(2) Date: Aug. 15, 2017

(87) PCT Pub. No.: WO2016/131725
PCT Pub. Date: Aug. 25, 2016

(65) Prior Publication Data
US 2018/0038442 A1    Feb. 8, 2018

(30) Foreign Application Priority Data
Feb. 17, 2015    (DE) .......................... 10 2015 202 839

(51) Int. Cl.
*F16F 1/36*      (2006.01)
*F16F 9/49*      (2006.01)
(Continued)

(52) U.S. Cl.
CPC ............... *F16F 9/49* (2013.01); *B60G 13/06* (2013.01); *F16F 1/3732* (2013.01);
(Continued)

(58) Field of Classification Search
CPC .. F16F 9/585; F16F 9/58; F16F 1/3732; F16F 1/376
See application file for complete search history.

(56) References Cited

U.S. PATENT DOCUMENTS

| | | |
|---|---|---|
| 2,642,845 A | 6/1953 | Stevens |
| 3,913,460 A | 10/1975 | Wright |
| (Continued) | | |

FOREIGN PATENT DOCUMENTS

| | | |
|---|---|---|
| DE | 69503887 T | 5/1999 |
| DE | 102006022490 A | 1/2007 |
| (Continued) | | |

OTHER PUBLICATIONS

Machine translation of DE 10 2006 005 621 (no date).*
(Continued)

*Primary Examiner* — Nicholas J Lane
(74) *Attorney, Agent, or Firm* — thyssenkrupp North America, Inc.

(57) ABSTRACT

A vibration damper for a vehicle chassis may comprise a damper tube, a piston rod that is movable in an oscillating manner in an axial direction in the damper tube, a working piston disposed on the piston rod, and a closure package that closes the damper tube and through which the piston rod is guided. A spring element that is disposed in a region between the working piston and the closure package may comprise an annular basic body that surrounds the piston rod to form an annular chamber, an upper side facing the closure package, and a lower side facing the working piston. To reduce vibrations and noise from reaching a vehicle body, the spring element may include a lip element on the upper and/or lower side, and a spring rigidity of the lip element may be lower than a rigidity of the annular basic body.

5 Claims, 5 Drawing Sheets

(51) Int. Cl.
*F16F 1/373* (2006.01)
*F16F 9/58* (2006.01)
*B60G 13/06* (2006.01)
*F16F 9/32* (2006.01)
*F16F 15/02* (2006.01)

(52) U.S. Cl.
CPC ............ *F16F 9/3221* (2013.01); *F16F 9/585* (2013.01); *F16F 15/022* (2013.01); *F16F 2224/00* (2013.01)

(56) References Cited

U.S. PATENT DOCUMENTS

| | | | | |
|---|---|---|---|---|
| 5,850,776 | A * | 12/1998 | Takeuchi | F15B 15/226 92/85 R |
| 9,046,146 | B2 * | 6/2015 | Cotter | F16F 9/48 |
| 2006/0283674 | A1 * | 12/2006 | Klein | F16F 9/49 188/284 |
| 2011/0260382 | A1 * | 10/2011 | Yu | F16F 1/3732 267/292 |
| 2013/0119593 | A1 * | 5/2013 | Konno | F16F 1/376 267/293 |
| 2015/0316119 | A1 | 11/2015 | Lehnen | |

FOREIGN PATENT DOCUMENTS

| | | | |
|---|---|---|---|
| DE | 102006005621 A | 8/2007 | |
| DE | 102006005621 A1 * | 8/2007 | ............... F16F 9/49 |
| DE | 102007037954 A | 2/2009 | |
| DE | 102012111474 A | 5/2014 | |
| EP | 0335201 A | 10/1989 | |
| EP | 1734275 A | 12/2006 | |
| EP | 2600029 A | 6/2013 | |
| JP | S56127438 U | 9/1981 | |
| JP | 2013115840 A | 6/2013 | |
| JP | 2013 155840 A | 8/2013 | |
| JP | 2013155840 A * | 8/2013 | |

OTHER PUBLICATIONS

Machine translation of JP 2013-155840 (no date).*
English Translation of International Search Report issued in PCT/EP2016/053043, dated May 4, 2016 (dated May 13, 2016).
English abstract for DE102006022490A.
English abstract for DE102007037954A.
English abstract for DE69503887T.

* cited by examiner

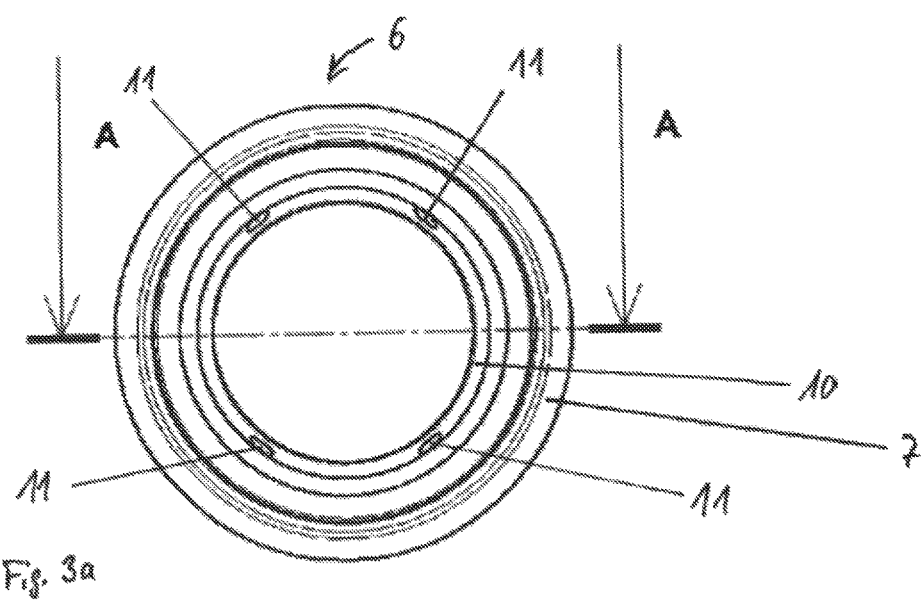

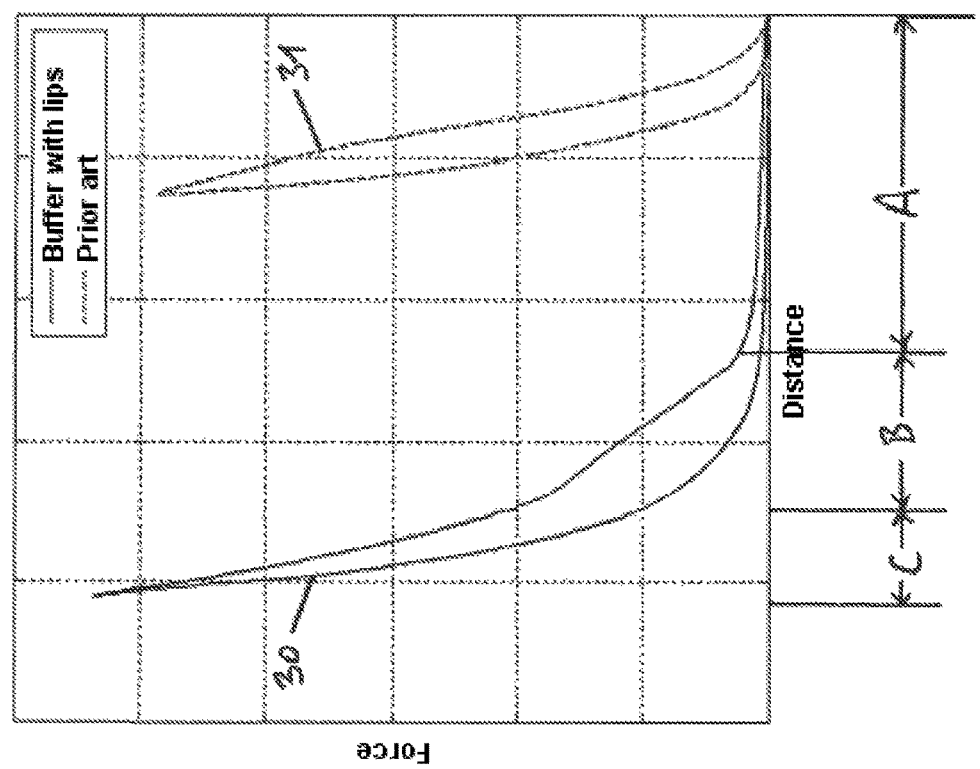

VIBRATION DAMPER WITH A TRACTION STOP

CROSS REFERENCE TO RELATED APPLICATIONS

This application is a U.S. National Stage Entry of International Patent Application Serial Number PCT/EP2016/053043, filed Feb. 12, 2016, which claims priority to German Patent Application No. DE 10 2015 202 839.9 filed Feb. 17, 2015, the entire contents of both of which are incorporated herein by reference.

FIELD

The present disclosure generally relates to vibration dampers for motor vehicle chassis as well as spring elements positioned between working pistons and closure packages closing damper tubes of vibration dampers.

BACKGROUND

A vibration damper of this type and a spring element of this type are known from the document DE 10 2006 005 621 A1. In FIGS. 1 and 2, this document describes two differently designed spring elements which are arranged between the rebound buffer spring and the closure package closing the damper tube. The present invention is based on the embodiment illustrated in FIG. 2 as the closest prior art. A spring element designed as a circular-ring-shaped elastomeric body 31 is arranged between the rebound buffer spring (helical spring 19) and the closure package (piston rod guide 5) closing the damper tube (cylinder 3). The elastomeric body 31 is supported in the axial direction on the spring plate 23, on which the rebound buffer spring is also supported. The spring plate 23 comprises an encircling annular web 49 which constitutes an axial buffer for the hydraulic construction unit 15 and therefore determines the minimum compressed length thereof.

Carriageway-induced vibrations which act on the vibration damper occur in the driving mode. At a defined amplitude during the wheel rebound process, the rebound buffer spring enters into engagement, i.e. the elastomeric body 31 comes into contact with the closure package, and the rebound buffer spring and the elastomeric body are compressed. This engagement of the rebound buffer spring leads to the vibrations spreading via the piston rod into the vehicle body and, as a result, into the passenger cell. This may produce undesirable noises and/or vibrations which, inter alia, reduce the driving comfort. Furthermore, undesirable noises also arise whenever, within the scope of a compression stage movement of the vibration damper (the piston rod moves into the damper tube), the elastomeric body disengages again from the closure package. Even during this disengaging process, vibrations and mechanical impacts are transmitted via the piston rod into the vehicle body and the passenger cell, which leads to the production of noise.

BRIEF DESCRIPTION OF THE FIGURES

FIG. 3a is a top view of an example spring element.

FIG. 3b is an axial half section view of the spring element of FIG. 3a taken across line A-A of FIG. 3a.

FIG. 4 is a force/distance diagram in which the force/distance behavior of an example spring element according to the present disclosure is compared to that of an elastomeric body that is known from the prior art (e.g., German Patent Publication No. DE 10 2006 005 621 A1) without lip elements.

DETAILED DESCRIPTION

Figure 1:
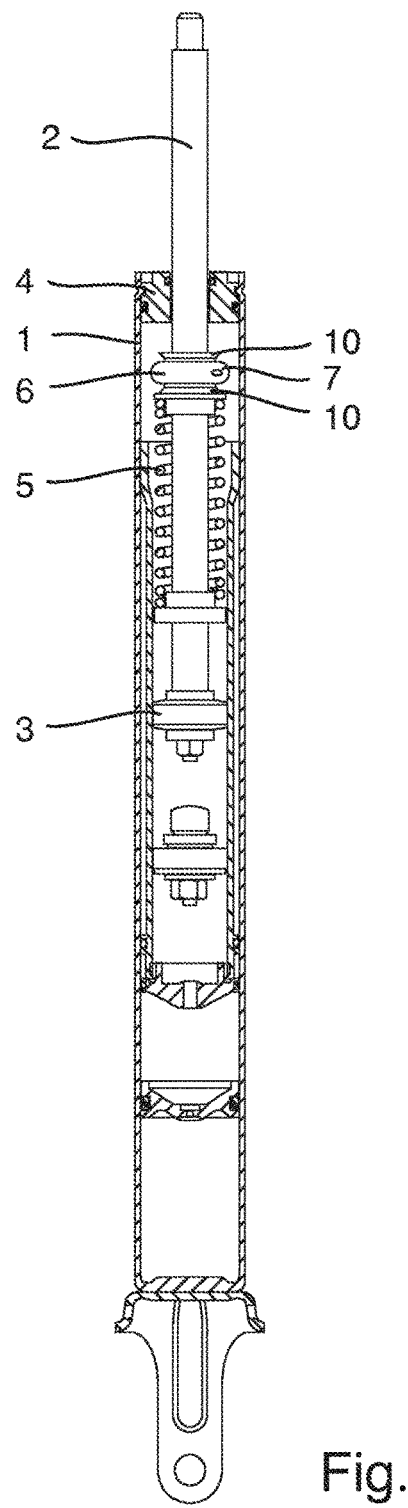
FIG. 1 is a half sectional view of an example vibration damper.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

It is an object of the present invention to specify a vibration damper in which the above-described production of noise and introduction of vibrations into the vehicle body is significantly reduced and ideally minimized.

The starting point for achieving the abovementioned technical object is the concept of optimizing the behavior of the vibration damper in respect of the introduction of vibrations and impacts upon engagement of the spring element or of the rebound buffer spring in a rebound stage movement of the piston rod and upon disengaging of the spring element or of the spring element and the rebound buffer spring in a compression stage movement of the piston rod.

In some examples, the spring element may comprise a lip element at least on the upper side or on the lower side, wherein the spring rigidity of the lip element is lower than that of the basic body. As a result of the fact that, according to the present disclosure, in addition to the basic body, a lip element, the spring rigidity of which is lower than that of the basic body, is provided on at least one side (upper side or lower side) of the basic body, the vibrations and impacts are absorbed to a great extent. The deformation of the elastically deformable lip element causes the vibrations and impacts to be damped, and therefore the latter are introduced only to a considerably reduced extent into the vehicle body via the piston rod and structural components. The production of noise is thereby significantly reduced. An increase of the driving comfort is also associated with a reduction in the production of noise and the introduction of vibrations.

According to an embodiment of the invention, the spring element comprises a respective lip element both on the upper side and on the lower side. This double-sided arrangement of the lip elements leads to an effective reduction of the production of noise and therefore to acoustic improvements during the driving mode. The lip elements which are arranged on both sides bring about greater damping and energy absorption of the vibrations and impacts in comparison to an arrangement of a lip element on only one side. Nevertheless, there may be application situations (for example, when the spring element according to the invention is used in a vibration damper without a rebound buffer spring provided in addition to the spring element according to the invention), in which an arrangement of a lip element on only one side of the basic body is sufficient to achieve the desired damping effect and absorption effect.

According to an embodiment of the invention, the lip elements are formed integrally with the annular basic body. The spring element can then be produced as an injection molded part, which is expedient in particular for cost-effective manufacturing of a large batch size of spring elements according to the invention for series use.

According to an embodiment of the invention, the spring element comprises pressure equalizing bores, through which damping medium can flow out of the annular chamber or can flow into the annular chamber during elastic deformation of the spring element. These pressure equalizing bores effectively and simply prevent the spring element from firmly attaching to the closure element of the vibration damper as a result of formation of negative pressure in the annular chamber surrounded by the spring element. It is thus ensured that the spring element always reliably disengages from the closure package in particular even after large deformations of the spring element.

According to a refinement of the invention, the pressure equalizing bores are arranged in the lip elements and in the basic body. If the lip elements, for example during a rebound movement of the piston rod (rebound stage movement), are initially placed against the closure package and are deformed when the rebound movement persists further, the damping medium flows out of the annular chamber, which is surrounded by the spring element, through the pressure equalizing bores in the lip elements. At the same time, the damping medium can also flow out through the pressure equalizing bores arranged in the basic body. If the lip elements are greatly deformed, it is possible for the pressure equalizing bores arranged in the lip elements to be closed; in this case, the damping medium can flow out of the annular chamber through the pressure equalizing bores arranged in the basic body.

The above description in respect of the flow of damping medium out of the annular chamber also applies analogously to the flow of damping medium into the annular chamber when the spring element relaxes again from its compressed state. An adhesion of the spring element on the closure package as a result of a negative pressure arising in the annular chamber is reliably avoided by the pressure equalization via the pressure equalizing bores.

According to a refinement of the invention, a rebound buffer spring is arranged between the working piston and the closure package. In this case, the spring element is arranged between the rebound buffer spring and the closure package. Measurements at test stands have shown that, when a rebound buffer spring is present between the working piston and the closure package, vibrations and impacts are effectively damped and the vibration and impact energy is absorbed whenever the lip elements are arranged on the spring element on both sides, i.e. when a first lip element is arranged on the upper side facing the closure package and a second is arranged on the lower side of the basic body, said lower side facing the working piston. An undesirable transmission of vibrations into the vehicle body and an undesirable development of noise are thereby effectively minimized.

If the vibration damper comprises a rebound buffer spring between the working piston and the closure package, and the spring element is arranged between the rebound buffer spring and the closure package, the spring rigidity of the lip elements should not only be lower than that of the basic body of the spring element, but also lower than that of the rebound buffer spring in order to avoid a relatively undamped introduction of vibrations into the vehicle body via the rebound buffer spring. In particular, mechanical helical springs, which are frequently used as rebound buffer springs in vibration dampers, comprise only small damping properties for damping the carriageway-induced vibrations and impacts occurring in the driving mode. The spring element, which comprises lip elements comprising a lower spring rigidity than that of the rebound buffer spring, is placed, according to the invention, in the transmission path for the carriageway-induced vibrations and impacts in such a manner that the vibrations and impacts are substantially damped away and the vibration and impact energy is substantially absorbed. The lip elements comprising the softer spring rigidity (frequently also referred to as the spring rate) in comparison to the basic body and the rebound buffer spring have the effect that the damping action of the spring element according to the invention already starts at significantly lower forces than if only one elastomeric body comprising a comparatively large spring rigidity is arranged between the rebound buffer spring and the closure package.

This can thus be expressed as follows: the spring element according to the invention is interposed into the transmission path of the vibrations and impacts between the rebound buffer spring and the closure package in such a manner that, because of the lip elements comprising a comparatively low spring rigidity, the damping action of the spring element for the carriageway-induced vibrations and impacts already starts at significantly lower forces than if an elastomeric basic body comprising a comparatively large spring rigidity is arranged between the rebound buffer spring and the closure package.

In principle, the lip elements can be composed of a different material than the basic body of the spring element. In such a configuration of the spring element according to the invention, there is the option for the constructor to select the material of the lip elements in such a manner that the material comprises the desired spring rigidity for a predetermined shape of the lip elements. The production in the form of an integral injection molded part is appropriate in respect of cost-effective manufacturing of large batch sizes of the spring elements according to the invention. In this case, the basic body and the lip elements are composed of the same material. The spring rigidity of the lip elements can then be set firstly via the geometrical configuration thereof and secondly also by suitable aftertreatments (e.g. tempering, etc.).

FIG. 1 illustrates a vibration damper according to the invention. Arranged in a damper tube 1 is a piston rod 2 which is movable to and fro in an oscillating manner in the direction of the longitudinal axis of the damper tube (i.e. in the axial direction), to which a working piston 3 is fastened. The damper tube is filled with damping medium (e.g. hydraulic oil) and, in the driving mode, flows through the working piston, generating damping forces, when the piston rod moves out of the damper tube (what is referred to as the rebound stage movement of the piston rod) or moves into the damper tube (what is referred to as the compression stage movement or else compression movement of the piston rod). The working piston 3 divides the interior space of the damper tube 1 into a piston-rod-side working chamber and a piston-rod-remote working chamber. The closure package 4 sits firmly in the damper tube and closes the latter tightly in relation to the surroundings. The closure package 4 is penetrated by the piston rod 2. The movements of the piston rod are guided through the closure package 4. The closure package is therefore also frequently referred to as a sealing and guiding package.

Figure 2:
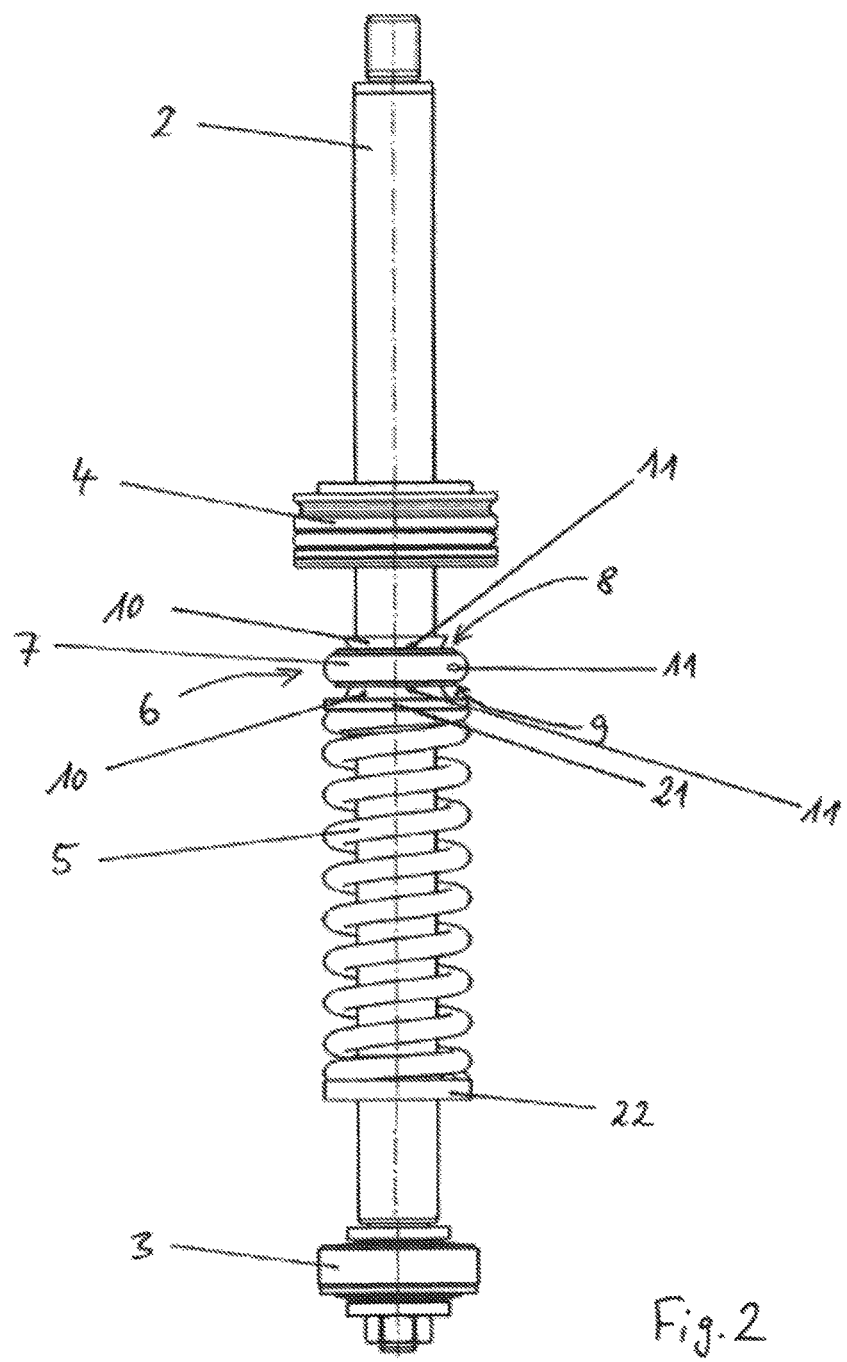
FIG. 2 is a side view of an example assembly comprising a rebound buffer spring and a spring element without a damper tube.

FIG. 2 shows the vibration damper according to the invention as per FIG. 1 in order to improve the clarity in a somewhat enlarged illustration and without the damper tube 1 and also without further components of the vibration damper. In the piston-rod-side working chamber, a rebound buffer spring 5 which, in the exemplary embodiment illustrated, is designed as a mechanical helical spring is arranged between the working piston 3 and the closure package 4. At its end facing the working piston, the rebound buffer spring 5 is supported on a spring plate 21 which, for its part, is supported on the piston rod 2 in the axial direction. At its end facing the closure package 4, the rebound buffer spring 5 is supported on a spring plate 22 which, for its part, is supported on the piston rod 2 in the axial direction. The spring element 6 according to the invention is arranged between the rebound buffer spring 5 and the closure package 4. The spring element 6 has a basic body 7, on the upper side of which facing the closure package 4 and on the lower side of which facing the working piston 3 respective lip elements 10 are arranged. The spring rigidity of the lip elements 10 is lower than that of the basic body 7 and that of the rebound buffer spring 5. From a predetermined amplitude, the spring element 6 is placed with its upper-side lip element against the closure package 4 during a rebound movement of the piston rod 2 (rebound stage movement). During a persisting rebound movement of the piston rod 2, the lip elements 10 are then first of all compressed. As a result, vibrations and impacts are damped and the vibration and impact energy is converted into deformation energy and thus absorbed. With its lip elements 10, the spring element 6 according to the invention therefore prevents vibrations and impacts from being undesirably transmitted via the rebound buffer spring 5 into the piston rod 2 and by the latter into the vehicle body and therefore into the passenger cell.

Even if, from a position in contact with the closure package 4, the spring element 6 disengages again from the closure package because of a compression stage movement of the piston rod 2 (piston rod 2 moves into the damper tube 1), vibrations and/or impacts are introduced into the piston rod and transmitted into the vehicle body. This likewise leads to an undesirable development of noise in the passenger compartment. Even these vibrations and impacts are effectively damped and absorbed by the lip elements 10 of the spring element 6 according to the invention. The production of undesirable noises as the spring element 6 disengages from the closure package 4 is thereby significantly reduced or minimized.

The spring element 6 has pressure equalizing bores 11 which are arranged firstly in the basic body 7 and secondly in the lip elements 10. Damping medium can flow out of the annular chamber between the piston rod 2 and the spring element 6 through said pressure equalizing bores 11 when the spring element 6 is compressed over the course of a rebound stage movement of the piston rod 2. Similarly, damping medium can flow out of the piston-rod-side working chamber of the vibration damper into the annular chamber between the piston rod 2 and the spring element 6 when the spring element 6 relaxes again from a compressed state over the course of a compression stage movement of the piston rod 2. The pressure equalization resulting therefrom ensures that the spring element 6 does not attach or adhere to the closure package 4 and no longer disengages from the closure package 4.

Figure 3B:
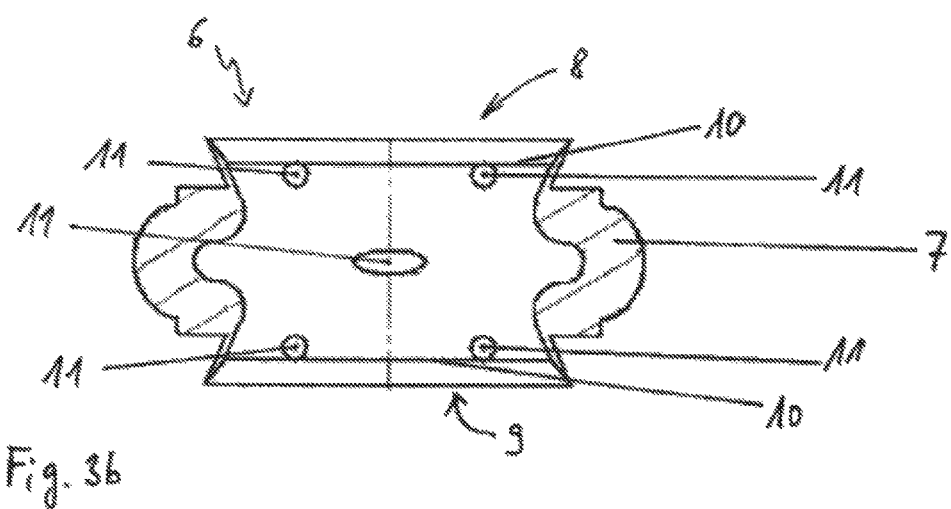

FIG. 3*a* shows the spring element 6 according to the invention in top view. The upper side 8 of the spring element 6, which upper side faces the closure package in the installed state, and the lip element 10 which is arranged on the upper side 8 and comprises the pressure equalizing bores 11 which are arranged therein can be seen. FIG. 3*b* shows the spring element 6 according to FIG. 3*a* in an axial half section along the intersecting line A-A from FIG. 3*a*. The spring element 6 comprises a basic body 7 which is of bellows-shaped design and arches radially outward. Pressure equalizing bores 11, of which one can be seen in FIG. 3*b*, are provided in the basic body 7. Lip elements 10 are arranged on both sides on the basic body 7. The lip elements 10 are formed integrally with the basic body 7. Pressure equalizing bores 11 are arranged in the lip elements 10. The spring element 6 is designed as an injection molded part. The lip elements 10 comprise a substantially lower spring rigidity in relation to the basic body 7. Said lower spring rigidity is firstly achieved by the significantly smaller wall thickness of the lip elements 10 in comparison to the basic body 7. In addition, after the injection molding, other aftertreatment measures (e.g. tempering) can also be carried out in order to set the desired spring rigidity of the lip elements 10.

FIG. 4 shows a force/distance diagram for an assembly consisting of a rebound buffer spring and the spring element 6 according to the invention. The force/distance characteristic 30 (solid line) of a spring element 6 according to the invention and the force/distance characteristic 31 (dashed line) of an elastomeric basic body without lip elements according to the prior art are plotted in comparison to each other in the diagram. It can very clearly be seen that, in the case of the elastomeric body from the prior art, there is a rapid rise in force with a large gradient even after short deformation distances. The force profile runs steeply and approximately linearly upward even at relatively short deformation distances. In the case of such a characteristic profile, a relatively undamped introduction of vibrations into the vehicle body takes place. The hysteresis of the force/distance characteristic of the spring element according to the prior art is relatively small. The dissipation of force during relaxation of the spring element according to the prior art runs substantially in parallel and therefore equally steeply to the rise in force during compression.

By contrast, in the case of the spring element 6 according to the invention, the build up of force starts only at significantly greater deformation distances. In other words, in the case of the spring element 6 according to the invention, a much smaller force builds up over the same deformation distance in comparison to the spring element according to the prior art. In the case of the spring element 6 according to the invention, only a very small force builds up over a relatively large deformation distance (range A). This is the range in which the lip elements 10 are deformed. After the lip elements 10 have completely deformed, the deformation of the basic body 7 begins (range B). Within this range, the force/distance characteristic profile is determined by the spring rigidity of the basic body 7. The adjoining range C constitutes the range in which the rebound buffer spring runs up against a block. The force/distance characteristic for the spring element 6 according to the invention comprises significantly greater hysteresis in comparison to the characteristic for the spring element according to the prior art, said hysteresis indicating a greater damping extent and therefore a greater energy absorption capacity of the assembly consisting of rebound buffer spring 5 and spring element 6 than in the prior art.

LIST OF REFERENCE SIGNS

1 Spring element
2 Piston rod
3 Working piston
4 Closure package
5 Rebound buffer spring
6 Spring element
7 Basic body
8 Upper side
9 Lower side
10 Lip element
11 Pressure equalizing openings; pressure equalizing bores
21 Spring plate
22 Spring plate
30 Force/distance characteristic
31 Force/distance characteristic
A Range
B Range
C Range

What is claimed is:

1. A vibration damper for a chassis of a motor vehicle, the vibration damper comprising:
   a damper tube;
   a piston rod that is movable in an oscillating manner in an axial direction in the damper tube;
   a working piston that is disposed on the piston rod;
   a closure package that closes the damper tube, wherein the piston rod is guided through the closure package; and
   a spring element that is disposed in a region between the working piston and the closure package, wherein the spring element comprises
      an annular basic body that surrounds the piston rod and forms an annular chamber between the annular basic body and the piston rod,
      an upper side that faces the closure package,
      a lower side that faces the working piston, and
      a lip element disposed on the upper side or the lower side, wherein a spring rigidity of the lip element is lower than a spring rigidity of the annular basic body,
   wherein the spring element comprises pressure equalizing openings through which a damping medium can flow out of or into the annular chamber during elastic deformation of the spring element, and
   wherein the lip element is a first lip element, the spring element further comprising a second lip element disposed on the lower side of the spring element, wherein the pressure equalizing openings are configured as pressure equalizing bores that are disposed in the first and second lip elements and in the annular basic body.

2. The vibration damper of claim 1 wherein the first and second lip elements are integral with the annular basic body.

3. The vibration damper of claim 1 further comprising a rebound buffer spring disposed between the working piston and the closure package, wherein the spring element is disposed between the rebound buffer spring and the closure package.

4. A spring element that is positionable in a vibration damper for a motor vehicle, between a working piston and a closure package that closes a damper tube of the vibration damper, wherein the spring element comprises:
   an annular basic body that is positionable to surround a piston rod of the vibration damper to form an annular chamber between the annular basic body and the piston rod;
   an upper side that faces the closure package;
   a lower side that faces the working piston; and
   a lip element disposed on the upper side or on the lower side, wherein a spring rigidity of the lip element is lower than a spring rigidity of the annular basic body, comprising pressure equalizing openings through which a damping medium can flow out of or into the annular chamber during elastic deformation of the spring element, and
   wherein the lip element is a first lip element that is disposed on the upper side, the spring element further comprising a second lip element disposed on the lower side, wherein the pressure equalizing openings are configured as pressure equalizing bores that are disposed in the first and second lip elements and in the annular basic body.

5. The spring element of claim 4 wherein the first and second lip elements are integral with the annular basic body.

* * * * *